United States Patent [19]

Luginbühl

[11] 3,812,948
[45] May 28, 1974

[54] DEVICE FOR SEPARATING AND CONVEYING OF ARTICLES, FOR EXAMPLE, CHOCOLATE BARS

[75] Inventor: Pierre Luginbühl, Neuhausen am Rheinfall, Switzerland

[73] Assignee: Schweizerische Industrie-Gesellschaft, Neuhausen am Rheinfall, Switzerland

[22] Filed: May 1, 1972

[21] Appl. No.: 249,680

[30] Foreign Application Priority Data
May 17, 1971   Switzerland.................... 7284/71

[52] U.S. Cl. ............................ 198/20 R, 198/34
[51] Int. Cl. ............................................ B65g 47/00
[58] Field of Search ........... 198/25, 20, 34; 221/262

[56] References Cited
UNITED STATES PATENTS
| | | | |
|---|---|---|---|
| 3,424,293 | 1/1969 | Deutschlander | 198/34 |
| 3,590,972 | 7/1971 | Mosterd | 198/20 |
| 3,615,001 | 10/1971 | Temple | 198/34 X |

FOREIGN PATENTS OR APPLICATIONS
| | | | |
|---|---|---|---|
| 6,717,724 | 7/1969 | Netherlands | 198/20 R |

Primary Examiner—Evon C. Blunk
Assistant Examiner—Douglas D. Watts
Attorney, Agent, or Firm—Hill, Gross, Simpson, Van Santen, Steadman, Chiara & Simpson

[57] ABSTRACT

A device for separating and conveying articles, such as chocolate bars, which are moved in engagement with each other by an input conveyor and are transferred by a periodically operating transfer member onto an output conveyor which operates in synchronism with said transfer member which engages the articles during their conveying movement and moves the same with a speed which is greater than the speed of the output conveyor. The transfer member comprises a pusher which is moved along a closed elliptical path which is arranged in a plane which is vertical to a plane containing the axis of the path of the input conveyor and thereby transfers the articles from the path of the input conveyor to the path of the output conveyor in such manner that the articles will be in spaced relation to each other on said output conveyor. Preferably, the input and output conveyors are arranged at a slight angle with respect to each other.

5 Claims, 6 Drawing Figures

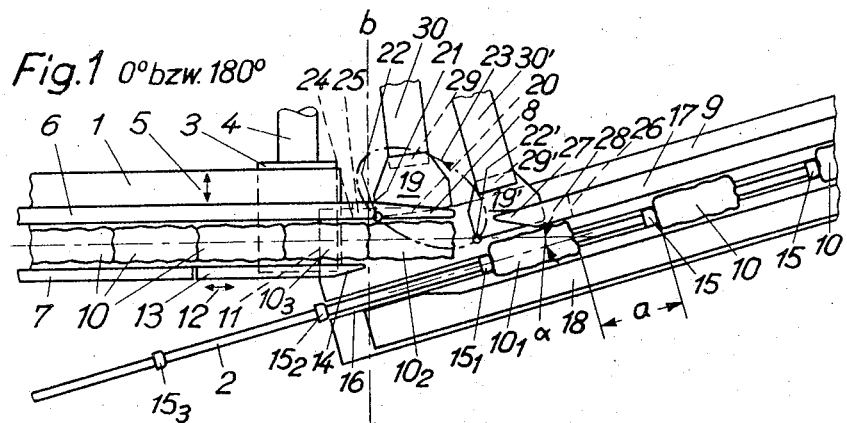
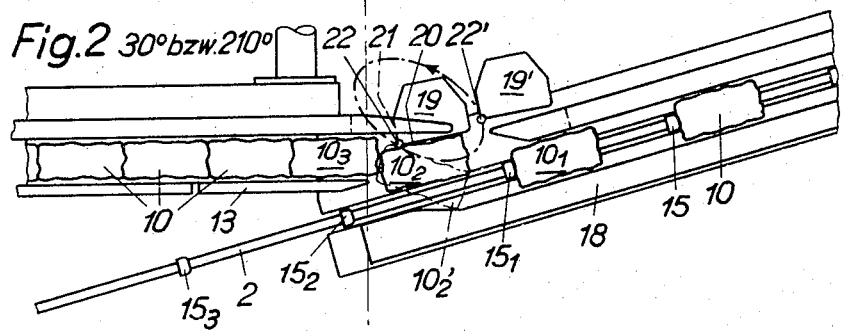
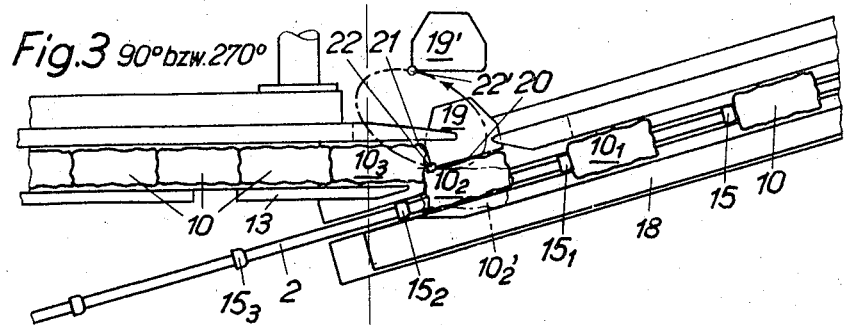
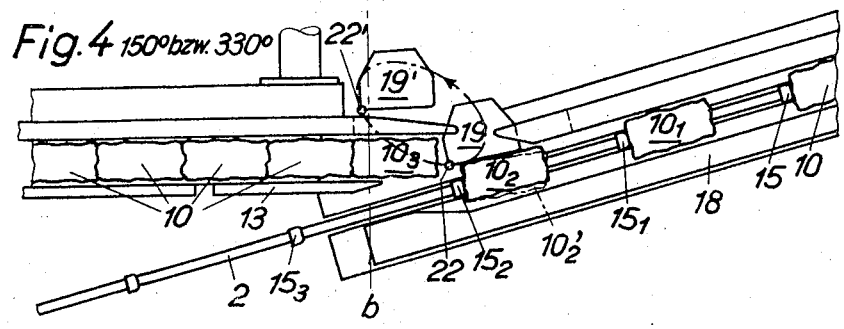

DEVICE FOR SEPARATING AND CONVEYING OF ARTICLES, FOR EXAMPLE, CHOCOLATE BARS

The invention relates to a device for the separation and conveyance of articles traveling in mutual contact on an input conveyor, with at least one periodically moved transfer member, whose movement is in synchronism with an output conveyor and in each operative cycle grasps an article while traveling and guides it to the output conveyor, whose speed is greater than that of the input conveyor, whereby the paths of the two conveyors lie at least approximately in one plane. Such a device, known for example from the Swiss patent No. 489,412 of the applicant, compared with devices previously used for the same purpose and in which the articles were held for a short time on the input conveyor for the purpose of synchronization with the output conveyor, — has the advantage of operating much more rapidly. In the known device is provided as a transfer member a gripping clamp having two claws which engage the article, for example, a chocolate bar laterally and release it again after delivery and engagement by the output conveyor.

The required expense of construction is substantial, and in addition, the speed of operation cannot be increased beyond a speed limited by the inertia of the gripping jaws and their actuating members. Furthermore, the known device is not very suitable for the processing of articles having greater mass tolerances. Besides, the operation of this device is not very favorable for products which are supplied in direction of their longitudinal axis.

It is an object of the present invention to overcome these disadvantages and to provide a device distinguished by conveying paths which form an acute angle $\alpha$ with one another, and wherein the transfer member which is constructed as a pusher, moves along a closed curve, which passes perpendicularly through the plane containing the path of the input conveyor, and thereby conveys the articles from the path of the input conveyor into the path of the output conveyor.

The drawing illustrates by way of example one embodiment of the invention.

IN THE DRAWINGS:

FIGS. 1, 2, 3 and 4 show the essential parts of a separating and conveying device in four phases of an operating cycle.

Figure 5:
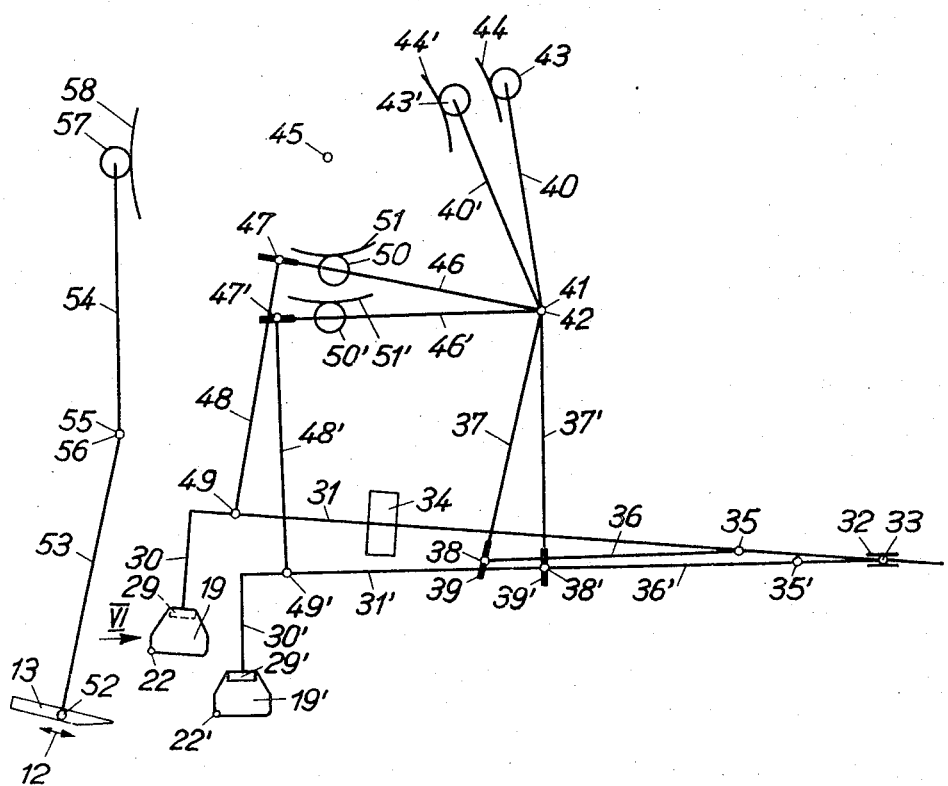
FIG. 5 shows diagrammatically in plan view a driving mechanism for the two pushers and a movable guide member.

Referring to FIG. 1, the device is provided with an input conveyor 1 and an output conveyor 2, whose paths intersect so as to form between the same an acute angle $\alpha$. The input conveyor 1 consists of an endless band, which travels over a reversing roller 3, mounted on a drive-shaft 4 rotatable about a horizontal axis. The useful width of the conveyor path is limited by an upper horizontal guide rail 6 and a fixed lower horizontal guide-rail 7. The guide 6 is vertically adjustable as indicated by the double arrow 5. The upper guide-rail 6 has a wedge-shaped sharpened end 8, which extends a certain distance beyond a table plate 9. The surface of the table plate 9 is located at the same level as the surface of the upper strand of the endless belt 1, so that the articles 10, for example, elongated chocolate bars of somewhat quadratic cross-section, so-called "bars" traveling on the belt in mutual contact run up on the point indicated by 11 on the table-edge of the table-plate 9. The fixed guide-rail 7 does not extend to the table 9, instead of which it is provided in its prolongation with a guide-member 13 movable to and fro in longitudinal direction as indicated by the double arrow 12. This last-mentioned guide-member 13 has on the table side also a wedge-shaped sharpened end 14.

The output conveyor 2 consists of an endless chain, which is fitted with actuators 15 perpendicularly attached to the chain. The table plate 9 has a slot 16, from which the actuators 15 project an extent beyond the table surface, in order to engage and convey the articles 10. For the lateral limitation of the path of the conveyor 2, two horizontally spaced guide-rails 17 and 18 are attached to the table-plate. These guide rails are adjustable in longitudinal- and transverse-directions, in order to take into consideration the size and the shape of the articles 10.

In order to transfer an article, which after the discharge from the input conveyor 1 onto the table-plate 9 has come into the position designated with $10_2$, to a position in front of an actuator $15_2$, of the output conveyor 2, so that it will be engaged by the actuator, the invention provides a pusher 19 comprising a plate whose thickness is about one-half the height of the bar. The plate 19 has two unequally long narrow sides 20 and 21, which intersect at a slightly rounded corner 22 and enclose an angle of approximately 90°. The pusher 19 is moved so that its corner 22 describes cyclically a somewhat ellipse-shaped curve 23. The pusher 19 moves directly over the table plate 9, and in order not to prevent its movement, the upper guide-rail 6 is provided on its lower face from the hatched transverse line 24 on to its end 8 with a marginal recess 25, which is somewhat higher than the thickness of the pusher 19. Likewise, the guide-rail 7 is provided on its lower face from the dashed transverse line 26 on to its wedge-shaped sharpened end 27 with a marginal recess 28 thus insuring a free movement of the pusher 19.

Figure 6:
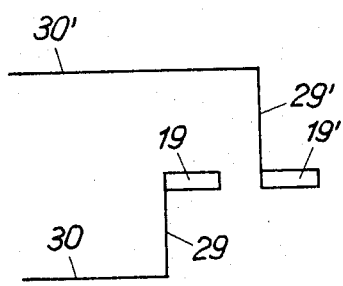
FIG. 6 shows diagrammatically in a side view a detail of this mechanism in the direction of the arrow VI of FIG. 5.

In the present case another second pusher 19' is provided, which is constructed exactly like the pusher 19 and whose corner 22' likewise moves cyclically along the path 23, however, with a phase offset corresponding to half the revolution time as compared with the corner 22. The pusher 19 is fixed on the upper end of a vertical bar 29 of rectangular cross-section at its lower end which changes into a horizontal bar of the same cross-section or is fixed to the same (see also FIG. 6). The pusher 19', however, is attached to the lower end of a vertical bar 29' of rectangular cross-section, which changes at its upper end into a horizontal bar 30' or is fixed to a horizontal bar 30'. An offsetting in height of the bars 30 and 30' is provided so that their drive gearing does not mutually interfere.

Prior to the description of these rods and the drive-gearings for the movable guide-member 13, however, the manner of operation of the pusher 19 or 19', respectively, will be explained with reference to FIGS. 1 to 4. In this connection, it is a prerequisite that their cyclic movement in the horizontal plane comprises a combined translatory- and pivotal-movement, whereby the latter, however, is relatively small. In order to be able to follow conveniently the movement of the individual parts of the device in the drawing, there has been entered as optical aid a dash-dotted reference line b—b extending vertically through all the FIGS. 1 to 4.

If one considers the condition of FIG. 1 as a starting position if the pusher 19 has assigned to it the phase 0° and the pusher 19' has assigned to it the phase 180°, then FIG. 2 corresponds to the phase 30° for the pusher 19 and 210° for the pusher 19'; FIG. 3 corresponds to the phase 90° for the pusher 19 and 270° for the pusher 19', while the FIG. 4 corresponds to the phase 150° for the pusher 19 and 330° for the pusher 19', respectively.

After the first half-period of the operating cycle, the positions of the pushers 19 and 19' in FIG. 1 are exchanged, that is, in the second half-period the positions of the pusher 19' are the ones for the pusher 19, and vice versa. It should be noted in the FIGS. 2 to 4, that a few details of FIG. 1 have been omitted.

Between 0° and 30°, the pusher 19 following the path 23 is practically translatorially moved toward the endless chain of the output conveyor 2, whereby its long narrow side 20 parallel to the same, engages the article $10_2$ laterally. This causes the article $10_2$ to be rotated as shown in solid lines and it engages the narrow side 20. It may, however, also occur sometimes that the article $10_2$ is rotated in the opposite direction, as is shown in dash-dotted lines at $10_2'$, so that it then is caught by the part of the guide 18 disposed opposite the pusher 19. Between 30° (FIG. 2) and 150° (FIG. 4) the pusher 19 following further the path 23, continues its translatorial approach to the output conveyor 2, whereby its short narrow side comes to lie in front of the next following article $10_3$ and thereby slightly brakes the movement of the same. This effects a synchronization of the movement of the input conveyor with the movement of the output conveyor, while at the same time, the article $10^2$ is pushed into the gap between the actuators $15_1$ and $15_2$ on the output conveyor 2. Shortly after 150° (FIG. 4), the corner 22 attains the point of greatest proximity to the output conveyor 2, and at 180° (position of 19' in FIG. 1), the pusher 19 has already clearly been removed from the same.

During the phase-angle 0° to about 120°, the guide-member 13 is moved forward, that is, in the direction of feed of the input conveyor 1, and between about 120° and 180° it is moved back again into its starting position. This prevents that the next article $10_3$ following the article $10_2$, through the friction exerted on it by the article $10_2$, is prematurely turned outwardly from the path of the input conveyor 1.

The following second half-period of the operating cycle of the pusher 19 comprises the transfer-half-period of the pusher 19', which now pushes the article $10_3$ in front of the actuator $15_3$, while the corner 22 of the pusher 19 is moved along the elongated, upper part of the curve 23 from its 180°-position into its 360°-position, that is, again into its 0°-position. Accordingly, in each operating cycle of the pusher 19 or 19', two articles 10 are moved from the input conveyor 1 onto the output conveyor 2, whereby they have in the conveyor 2 a distance a from one another, while they were in contact with each other or the input conveyor. It is apparent from FIGS. 1 to 4, that the pushers 19 and 19' move in their alternating transfer-half-periods practically translatorially, while during their return-half-periods, however, in addition to a translatory movement they perform also an oscillation in clockwise direction of the FIGS. 1 to 4 and then back again. This oscillation, as well as the fact that the average return speed of the pusher 19 or 19', respectively, is greater than its average operating speed, is conditioned by the construction shown in FIG. 5 of the drive-gearings for the pushers 19 and 19'.

The drive-gearing for the push-rod 19 according to FIG. 5, is provided with a rod 31, on whose left hand end is attached a bar 30 and which is supported in the vicinity of its right-hand end in a bearing 32, which latter is pivotal about a stationary, vertical axis 33. The rod 31 is furthermore, guided between its ends between two stationary horizontal guide-plates 34 which are disposed at the same level as the pivotal bearing 32. The rod 31 is accordingly movable in a horizontal plane and indeed it may be pushed in its longitudinal direction, and in addition may be rotatable about the vertical axis 33. The rod 31 is by means of a pivot joint 35 connected with one end of a horizontal connecting-rod 36, whose other end is pivoted to one end of a horizontal arm 37 by a bearing 38 which is adjustable in the longitudinal direction of the arm 37, which for this purpose is provided with a slot, indicated by a short thick line 39.

The arm 37 and a further horizontal arm 40 start from a common hub 41, which is pivotally journaled on a stationary vertical axis 42. The arm 40 carries a cam follower roll 43 which engages the circumference of a cam 44, which latter is shown only partially, and is seated on a vertical drive shaft 45, which for example, rotates continuously in the clockwise direction of FIG. 5, and is in synchronism with the drive of the output conveyor 2.

It is apparent that when the radius of the cam 44 increases, the arms 40 and 37 are rotated in clockwise direction, and that as a result thereof, the rod 31 is moved to the left by the connecting-rod 36. If the radius of the cam 44 later decreases again, the rod 31 is moved correspondingly backward towards the right.

On the axis 42 is journaled also a third arm 46 which, however, is pivotal independently of the arms 37 and 40. The arm 46 is connected by an adjustable pivot joint 47 with one end of a connecting-rod 48, whose other end is pivoted at 49 to the rod 31. The arm 46 carries a cam follower roller 50, which engages the circumference of a cam 51 shown only partially, and which likewise is seated on the drive shaft 45. It is apparent that when the radius of the cam 51 increases, the arm 46 and in view thereof also the rod 31 are rotated in counterclockwise direction, or vice versa, upon decrease of the radius of the cam 51. By a suitable shaping of the cams 44 and 51, it may be attained that the corner 22 of the pusher 19 moves in a closed, almost an elliptical path. All other points of the pusher 19 describe curves of similar type, which, however, are not congruent with one another on account of the small oscillation imposed on the translatory movement.

The gearing provided for the movement of the pusher 19' is constructed quite similarly to that of the pusher 19, except that the corresponding parts whose reference characters are provided with a "'", are disposed essentially in a horizontal plane disposed at a higher level, apart obviously from the vertical bars 29 and 29'. The pivot bearing 32' has not been illustrated, as it coincides in FIG. 5 up to a slight change in direction with the bearing 32. The connecting rod 36' coincides in this Figure with a part of the rod 31'. It should be noted that the cams 44 and 44', or 51 and 51', respectively, are similar to one another, however, are offset to one another by 180°.

The guide member 13 is attached to one end of an arm 53 by an adjustable screw 52 or the like. The arm 53 and a further arm 54 start from a hub 55, which is rotatable about a vertical axis 56. The arm 54 carries a cam follower roller 57, which engages the circumference of a cam 58 shown only partially. The circumference of the cam 58, which likewise is mounted on the drive shaft 45, has two circumferential sections equal to one another, of 180° each, whereby in each of the same, the radius first increases, in order to move the guide-member 13 forward, and then again decreases in order to move it back again. The guide-member 13 operates, of course, together with each of the two pushers 19 and 19', the frequency of its operating cycle is accordingly twice as great as that of the pushers 19 and 19'.

It obviously is possible to provide only one pusher and to move the guide-member 13 during its operating cycle only once to and fro. It is, however, clear, that thereby the capacity of the device would be cut in half, so that as a rule one is better served when paying for the somewhat higher expense caused by employing two pushers.

It should also be noted that the acute angle $\alpha$ between the conveying direction of the two conveyors 1 and 2 may be selected very small.

It may also be pointed out that in the device shown, the component of the speed of the pusher in the direction of feed of the belt 1 at the beginning is approximately up to 30° greater than the speed of the belt in order to advance the article $10_2$ by friction of the pusher to its separation from the article $10_3$. Later, for example, about 60°, this component becomes smaller than the speed of the belt, in order — as already mentioned — to retard the article $10_3$ and to effect a synchronous feed of the article between the actuators 15 of the chain 2. The pusher 19 after synchronization has taken place, is at once again accelerated, so that the article $10_3$ may now move freely.

In the embodiment of the device of the invention shown in FIGS. 1 to 6, the curve 23 lies parallel to the paths of the input and output conveyors. The curve 23 could, of course, also be oriented otherwise; it could for example also lie in a plane perpendicularly to the planes of the conveyor path. Furthermore, the curve 23 instead of causing a plane travel could also have a spatial travel.

The paths of the input and output conveyors, respectively need not necessarily be arranged in horizontal planes. They could just as well lie in otherwise oriented planes.

Under certain circumstances, it may be suitable to offset the two planes of the two conveyors by a small distance.

What I claim is:

1. Device for separating and conveying articles, such as chocolate bars, in a substantially horizontal plane, comprising:
    a substantially horizontal input conveyor for carrying a plurality of aligned articles in end to end engagement to a transfer station;
    a substantially horizontal output conveyor mounted for movement through said transfer station in close vicinity to the delivery end of said input conveyor at a greater velocity than the latter, said movement of the output conveyor being in the same general direction as the input conveyor but slightly out of parallelism therewith;
    an article pusher at said transfer station;
    operating means connected with said pusher and adapted to move said pusher in synchronism with said output conveyor along a substantially horizontal path, whereby said pusher engages the foremost article on said input conveyor and transfers the same to said output conveyor;
    a lateral guide bar positioned between said conveyors, and
    means moving said bar forwardly toward the transfer station to prevent lateral movement of a succeeding article when said foremost article is moved from the input to the output conveyor by said pusher.

2. A device constructed in accordance with claim 1: wherein said output conveyor has spaced article receiving stations thereon and said pusher operates in synchronism to move said foremost articles into said stations with said output conveyor moving continuously.

3. A device according to claim 1:
    and including a second pusher adapted to move in synchronism with said output conveyor along a substantially horizontal path and having a phase displacement of substantially 180° relative to the first pusher.

4. A device constructed in accordance with claim 1: wherein said pusher is operated by combined linkage and cam means driving the pusher in a path having the shape of a closed elliptical curve.

5. A device according to claim 1, including a first substantially vertical surface on said pusher for engagement with a lateral surface of said foremost article on the input conveyor, and a second surface on said pusher joining said first surface at a substantially right angle to form a corner edge therewith for engagement with and braking of the movement of the second foremost article on the input conveyor, said pusher moving in a substantially elliptical closed curve.

* * * * *